United States Patent
Liu et al.

(10) Patent No.: US 10,515,083 B2
(45) Date of Patent: Dec. 24, 2019

(54) EVENT ANALYSIS APPARATUS, AN EVENT ANALYSIS SYSTEM, AN EVENT ANALYSIS METHOD, AND AN EVENT ANALYSIS PROGRAM

(71) Applicant: YOKOGAWA ELECTRIC CORPORATION, Tokyo (JP)

(72) Inventors: Zhuo Liu, Tokyo (JP); Yuichi Sakuraba, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 328 days.

(21) Appl. No.: 15/341,439

(22) Filed: Nov. 2, 2016

(65) Prior Publication Data

US 2017/0132291 A1  May 11, 2017

(30) Foreign Application Priority Data

Nov. 6, 2015 (JP) .................................. 2015-218893

(51) Int. Cl.
*G06F 16/2458* (2019.01)
*G06F 7/08* (2006.01)
(Continued)

(52) U.S. Cl.
CPC ............ *G06F 16/2465* (2019.01); *G06F 7/08* (2013.01); *G06F 11/302* (2013.01); *G06F 11/3006* (2013.01); *G06F 11/3476* (2013.01)

(58) Field of Classification Search
CPC ............ G06F 11/3006; G06F 11/3476; G06F 11/302; G06F 17/30539; G06F 7/08; G06F 16/2465; G05B 23/0237; G05B 19/0426
(Continued)

(56) References Cited

U.S. PATENT DOCUMENTS

| 9,626,600 B2* | 4/2017 | Liu ..................... G06K 9/6296 |
| 2006/0095150 A1* | 5/2006 | Inoue ................. G05B 23/0267 700/95 |

(Continued)

FOREIGN PATENT DOCUMENTS

| JP | 10-027104 A | 1/1998 |
| JP | 2010-34998 A | 2/2010 |
| JP | 2011-081697 A | 4/2011 |

OTHER PUBLICATIONS

Kataoka et al., "Implementation of Operator Support System using Dynamic Simulator for Abnormal Plant Condition," International Conference on Computational Intelligence for Modelling Control and Automation, and International Conference on Intelligent Agents, Web Technologies and Internet Commerce; 2006 (6 pages total).

*Primary Examiner* — Phong H Nguyen
(74) *Attorney, Agent, or Firm* — Sughrue Mion, PLLC

(57) ABSTRACT

An event analysis device includes an event collector configured to collect event log data which represents operation history of a DCS operator; an event analyzer configured to analyze event log data collected by the event collector to extract analysis result data representing operation method based on the operation of the DCS operator or analysis result data representing operation intention based on the operation of the DCS operator; an operation sequence extractor configured to extract analysis result data respectively in every period in specified multiple periods and extract operation sequence sorting analysis result data based on operation time; and an operation sequence clusterer configured to cluster the operation sequence based on the degree of the similarity between the operation sequences which are different from each other.

20 Claims, 8 Drawing Sheets

(51) Int. Cl.
*G06F 11/30* (2006.01)
*G06F 11/34* (2006.01)

(58) Field of Classification Search
USPC .................................................. 707/737, 752
See application file for complete search history.

(56) References Cited

U.S. PATENT DOCUMENTS

| | | | |
|---|---|---|---|
| 2007/0192342 A1* | 8/2007 | Shriraghav | G06F 16/2453 707/999.1 |
| 2010/0026511 A1 | 2/2010 | Akao et al. | |
| 2012/0271587 A1* | 10/2012 | Shibuya | G05B 23/0229 702/127 |
| 2013/0073552 A1* | 3/2013 | Rangwala | H04L 67/10 707/737 |
| 2013/0179381 A1 | 7/2013 | Kawabata et al. | |
| 2014/0006433 A1* | 1/2014 | Hon | G06N 5/048 707/758 |
| 2014/0317040 A1* | 10/2014 | Liu | G06K 9/6296 706/46 |

* cited by examiner

FIG. 2

| EVENT ID | TIME AND DATE | TAG NAME | OPERATION TYPE | PREVIOUS VALUE | CURRENT VALUE |
|---|---|---|---|---|---|
| 1 | 2015/8/21 10:00:00 | TAG1 | MAN | AUT | MAN |
| 2 | 2015/8/21 10:00:10 | TAG1 | MV | 25.0 | 30.0 |
| 3 | 2015/8/21 10:00:30 | TAG1 | MV | 30.0 | 35.0 |
| 4 | 2015/8/21 10:00:50 | TAG2 | SV | 91.0 | 89.0 |
| 5 | 2015/8/21 10:01:00 | TAG1 | MV | 35.0 | 40.0 |
| 6 | 2015/8/21 10:02:50 | TAG2 | SV | 89.0 | 90.0 |
| 7 | 2015/8/21 10:03:00 | TAG1 | AUT | MAN | AUT |
| 8 | 2015/8/21 10:03:01 | TAG1 | SV | 2.0 | 3.0 |
| ⋮ | ⋮ | ⋮ | ⋮ | ⋮ | ⋮ |

FIG. 3

| BASIC UNIT OPERATION ID | STARTING DATE AND TIME | ENDING DATE AND TIME | TAG NAME | OPERATION TYPE | OPERATION METHOD | EVENT ID |
|---|---|---|---|---|---|---|
| No. 1 | 2015/8/21 10:00:00 | 2015/8/21 10:00:00 | TAG1 | MAN | MODE CHANGE | No. 1 |
| No. 2 | 2015/8/21 10:00:10 | 2015/8/21 10:01:00 | TAG1 | MV | RAMPING + | No. 2, No. 3, No. 5 |
| No. 3 | 2015/8/21 10:00:50 | 2015/8/21 10:02:50 | TAG2 | SV | FINE-TUNING | No. 4, No. 6 |
| No. 4 | 2015/8/21 10:03:00 | 2015/8/21 10:03:00 | TAG1 | AUT | MODE CHANGE | No. 7 |
| No. 5 | 2015/8/21 10:03:01 | 2015/8/21 10:03:01 | TAG1 | SV | SETTING CHANGE + | No. 8 |
| ... | ... | ... | ... | ... | ... | ... |

FIG. 4

| UNIT OPERATION ID | STARTING DATE AND TIME | ENDING DATE AND TIME | TAG NAME | OPERATION INTENTION | BASIC UNIT OPERATION ID |
|---|---|---|---|---|---|
| No. 1 | 2015/8/21 10:00:10 | 2015/8/21 10:03:01 | TAG1 | FLOW AMOUNT INCREASE | No. 1, No. 2, No. 4, No. 5 |
| No. 2 | 2015/8/21 10:00:50 | 2015/8/21 10:02:50 | TAG2 | TEMPERATURE FINE-TUNING | No. 3 |
| ... | ... | ... | ... | ... | ... |

EVENT ANALYSIS APPARATUS, AN EVENT ANALYSIS SYSTEM, AN EVENT ANALYSIS METHOD, AND AN EVENT ANALYSIS PROGRAM

BACKGROUND OF THE INVENTION

Field of the Invention

The present invention relates to an event analysis apparatus, an event analysis system, an event analysis method, and an event analysis program.

Priority is claimed on Japanese Patent Application No. 2015-218893, filed on Nov. 6, 2015, the contents of which are incorporated herein by reference.

Description of the Related Art

A control system such as DCS (Distributed Control System) may often record an event log of an operation by a DCS operator as an event log. Not only an operation history but also histories of an alarm and a guidance may be recorded in the event log. The user of the control system improves the control system which the DCS operator operated, by analyzing examples of efficiently performed operation and such case an alarm is generated due to the operation, with reference to the past event log. An event analysis device may be used for analysis of the event log as described above.

FIG. 8 is a block diagram showing a functional configuration of a prior event analysis system 3 and an event analysis device 30. As shown in FIG. 8, the event analysis system 3 includes, the event analysis device 30, an event log database 31, a display 35, a control system 36, and a historian 37. Further, as shown in FIG. 8, the event analysis device 30 includes an event collector 301, an event analyzer 303, and an analysis result output device 308.

The event collector 301 collects the event log data from the control system 36 and the historian 37, and records the event log data in the event log database 31. The event analyzer 303, in response to a user's request, accesses the event log database 31 and searches the event log data that matched the specified conditions. The event analyzer 303 performs the analysis processing, such as a cluster analysis of the event and the counting of the number of the events, based on the searched event log data. The analysis result output device 304, visualizes an operation event list based on the analysis result of the event log data, and tables and graphs showing the result of the statistical processing of the event log data, to be displayed on the display 35. Thus, the user can utilize an event analysis device 30 to specify period and a device name to refer the operation event sequences listed up in chronological order. For example, if a user focuses on specific work, and specifies the period during which the work has been carried out in the past, all of the events within the specified period are listed up in chronological order.

Incidentally, for example, in such plants, the DCS operator may manually perform the plant operation in the trouble shooting and the non-steady operation. In this case, even if it is the same work as the other works, due to the differences in external conditions and the DCS operator, the operation procedures of the work may not identical with the other works. If the procedures of the operation can be analyzed and clustered, it becomes possible to achieve the standardization of the manual operation. Here, the manual operation standardization means the operation in a common procedure without depending on the DCS operator's skill. Conventionally, in order to understand the operation of the DCS operator using the event analyzer, it is necessary to focus on individual period targeted work has been carried out, and to analyze the operation example from the operation event sequences in each period. However, since it is necessary to respectively analyze each work period, in the cases the many times of carrying out of the work, there is a problem that the manual analysis work is difficult.

Therefore, if the ability of automatically analyzing the sequences of the targeted event and clustering the operation procedure are provided in the event analyzer, the user can easily isolate the situation and organize the operation procedure. The monitoring system described in Japanese Patent Application Publication No. 2011-081697 (hereinafter, referred to as Patent Reference 1), automatically clusters the event sequences based on the similarity between the sequences of the event. The similarity between the sequences of events are defined based on the number of events which needs to be removed in order to change one of the sequences of events in the other event sequences, and which needs to add.

However, because the operation event is generated each time the setting value changes, when the DCS operator performs such as ramping and fine-tuning with respect to the setting value of the controller, a number of the operating events will be generated. Therefore, even if the DCS operator performs the same works in the same procedure, the number of the generated event and the order of the event are not necessarily the same.

Further, when performing the cluster analysis of the operation event sequences based on the similarity between the operation event sequences, small differences such as the number of the operation events is too emphasized.

Therefore, in the prior art, there is a problem that it is difficult to cluster the operation procedure of the DCS operator from the high level of abstraction perspective, such as clustering the overall flow of operation.

The present invention provides the event analysis apparatus, the event analysis system, the event analysis method, and the event analysis program, capable of clustering the past operation examples based on the similarity between the higher abstract operation sequences.

SUMMARY (1) One aspect of the present invention is an event analysis device includes an event collector configured to collect event log data which represents operation history of a DCS operator; an event analyzer configured to analyze event log data collected by the event collector to extract analysis result data representing operation method based on the operation of the DCS operator or analysis result data representing operation intention based on the operation of the DCS operator; an operation sequence extractor configured to extract analysis result data respectively in every period in specified multiple periods and extract operation sequences sorting analysis result data based on operation time; and an operation sequence clusterer configured to cluster the operation sequences based on the degree of the similarity between the operation sequences which are different from each other.

(2) In the above-noted aspect of the event analysis device, the operation sequence clusterer is configured to cluster the operation sequences based on similarity between operations on one or more controllers, and order, sequential and parallelism of the one or more operations on the controller.

(3) In the above-noted aspect, the event analysis device further includes a cluster analysis result output unit configured to visualize and display the operation sequences clustered by the operation sequences clusterer.

(4) In the above-noted aspect, the event analysis device further includes a similarity searcher configured to search the operation sequences groups similar to the operation sequences, based on the degree of the similarity between the operation sequences extracted by the operation sequences extractor and a representative operation sequences included in the operation sequences groups clustered in the past by the operation sequences clusterer.

(5) One aspect of the present invention is an event analysis system includes a log data manager and an event analysis device, wherein the log data manager configured to output event log data which is data represents an operation history of the operation by a DCS operator, the event analysis device further comprising: an event collector configured to collect event log data; an event analyzer configured to analyze event log data which is collected by the event collector and extract analysis result data representing the operation method based on the operation of the DCS operator or the operation intention based on the operation of the DCS operator; an operation sequence extractor configured to extract analysis result data in the specified multiple periods in every period and extract the operation sequences sorting analysis result data based on operation time; and an operation sequence clusterer configured to cluster the operation sequences based on the degree of the similarity between the operation sequences which are different from each other.

(6) One aspect of the present invention is an event analysis method using a computer includes: an event collection step of collecting an event log data which is the data representing an operation history of an operation by a DCS operator; an event analysis step of analyzing the event log data collected by the event collector and extracting an operation method based on the operation of the DCS operator and an analysis result data representing an operation intention based on the operation of the DCS operator; an operation sequences extracting step of extracting the analysis result data respectively in every period in the specified multiple periods, and extracting the operation sequences which sorted the analysis result data based on an operation time; and an operation sequences clustering step of clustering the operation sequences based on the degree of the similarity between the operation sequences.

(7) One aspect of the present invention is an event analysis program for causing a computer execute includes: an event collection step of collecting event log data which is the data representing operation history of an operation by a DCS operator; an event analysis step of analyzing event log data and extracting an operation method based on the operation of the DCS operator and an analysis result data representing an operation intention based on the operation of the DCS operator; an operation sequence extracting step of extracting the analysis result data respectively in every period in the specified multiple periods, and extracting the operation sequences which sorted the analysis result data based on an operation time; and an operation sequence clustering step of clustering the operation sequences based on the degree of the similarity between the operation sequences.

According to the present invention, it is possible to support the standardization of operation of the DCS operator according to cluster the past operation examples based on the similarity between higher abstract operation sequences.

BRIEF DESCRIPTION OF THE DRAWINGS

FIG. 2 is a diagram showing an example of an event log table stored in an event log database of the events analysis system according to the first embodiment of the present invention.

FIG. 3 is a diagram showing an example of a basic unit operation table the analysis result database of the event analysis system stores according to an embodiment of the present invention.

FIG. 4 is a diagram showing an example of the unit operation table the analysis result database of the event analysis system stores according to an embodiment of the present invention.

DETAILED DESCRIPTION OF THE INVENTION

Figure 1:
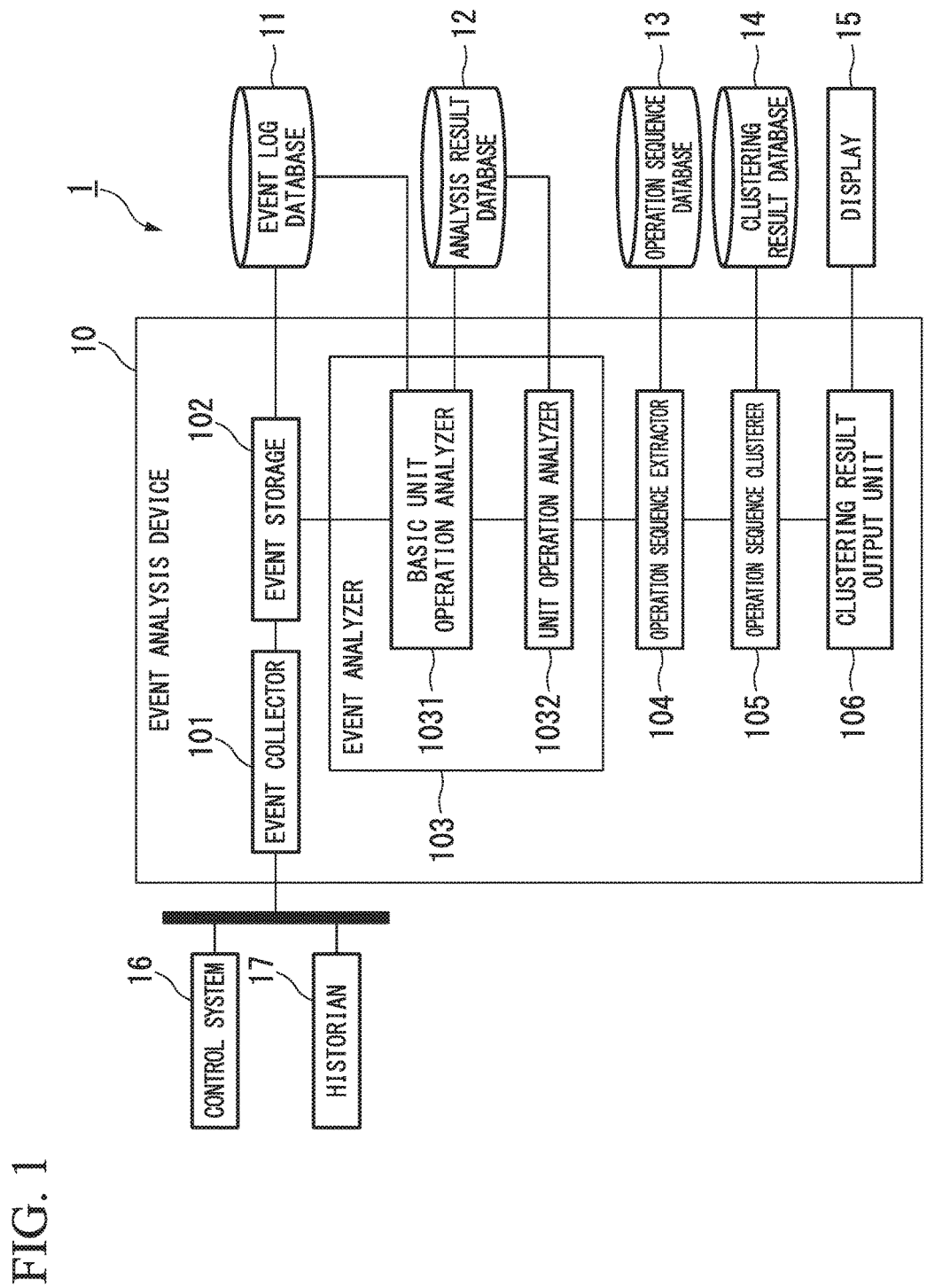
FIG. 1 is a block diagram showing a functional configuration of an event analysis system and an event analysis device according to the first embodiment of the present invention.

Hereinafter, a number of embodiments of the present invention will be described below, with references made to the drawings.

First Embodiment

An event analysis system according to the first embodiment of the present invention extracts operation intentions and operation methods of a DCS operator from an event log data representing an operation history of a control system operated by the DCS operator. In general, the DCS operator increases or decreases SV value (Set Variable) and MV value (Manipulated Variable) in order to increase or decrease process values such as flow amount and pressure. In addition, the DCS operator performs operation such as fine-tuning the process value in order to keep the value such as flow amount and pressure constant. That is, operation intention of the DCS operator's operation is to make the process value as the target increasing, decreasing, or stable. In the present invention, the event analysis device extracts the operation intentions.

For example, in a case that the DCS operator may increase the process value, the event analysis device may change the setting by a ramping which is the operation gradually changing the SV value and MV value, or may change the setting of the SV value and the MV value at once operation. Thus, there are multiple types of the operation methods for the operation based on the same operation intentions. Furthermore, the operation of ramping may be decomposed into more detailed operation. Therefore, the embodiment of the present invention, a "basic unit operation" representing the operation method is defined by gathering the event log data of the plurality of operation. Further, the embodiment of the present invention, an "unit operation" representing the operation intention is defined by gathering a plurality of basic unit operation.

It is defined any of the four types such as an "increase", a "decrease", a "fine-tuning" and a "increase and decrease" as the unit operation. The "increase and decrease" refers to the unit operation which is repeated the increasing and decreasing in short period. It is also possible to define unit operation other than four types of the unit operation described above. In addition, as the basic unit operation, it is defined any of the five types such as a "ramping (increase)," a "ramping (decrease)", a "fine-tuning", a "setting change (increase)", and a "setting change (decrease)".

Incidentally, there exist the ramping operation for gradually increasing the SV value and the MV value or the like, and the ramping operation for gradually decreasing the SV value and the MV value or the like. Thereby, in the embodiment of the present invention, the ramping operation in order to increase such as the SV value and the MV value is to be referred to as a "ramping +", and the ramping operation in order to decrease such as the SV value and the MV value is to be referred to as a "ramping −". In addition, the setting change is greatly changing the value at once operation. Similarly in the case of the ramping, the setting change operation in order to increase the SV value and the MV value or the like is to be referred to as a "setting change +", and the setting change operation to in order to decrease the SV value and the MV value or the like is to be referred to as a "setting change −".

It is possible to define basic unit operation other than the five types basic unit operation described above, as well as the unit operation. The unit operation is higher abstract operation than the basic unit operation. Therefore, in the analysis process of the event log data, firstly extracting the basic unit operation from the event log data, and then the extraction processes of two-stages are performed, such as extracting the unit operation from the extracted basic unit operation.

Further, the event analysis system 1 according to the first embodiment, extracts a highly abstract operation sequences from the extracted basic unit operation or the unit operation to cluster the operation examples based on the difference (similarity) in operation sequence. Furthermore, in order to quantify the difference in the operation sequences, the similarity between the operation on the controller and the similarity in consideration of the features of the characteristics of the plant operation such as the parallel trend of the operation is defined. The user is able to grasp the difference from the cluster analysis result between operation procedure according to external conditions of the work and the DCS operator's skills.

(The Configuration of the Event Analysis System and the Event Analysis Device)

Next, the configuration of the event analysis system 1 and an event analysis device 10 according to the first embodiment will be described with reference to the drawings. FIG. 1 is a block diagram showing a functional configuration of an event analysis system and an event analysis device according to the first embodiment of the present invention. An event analysis system 1 according to the first embodiment includes the event analysis device 10, an event log database 11, an analysis result database 12, an operation sequence database 13, a cluster analysis result database 14, a display 15, a control system 16, and a historian 17.

The event analysis device 10 includes, an event collector 101, an event storage 102, an event analyzer 103, an operation sequence extractor 104, an operation sequence clusterer 105, a clustering result output unit 106. Further, the event analysis device 10 includes a computer device, for example, a personal computer or a general-purpose computer. Further, the event analyzer 103 includes a basic unit operation analyzer 1031, configured to include a unit operation analyzer 1032.

The event collector 101 collects the event log data from the control system 16 and the historian 17. The event log data represents an event history such as the operation of the control system 16 by the DCS operator. The event collector 101 outputs the collected event log data to the event storage 102.

The control system 16 controls the plant (not shown). The control system 16 generates the event log data to output the event log data to at least one of the historian 17 or the event collector 101. The control system 16 may, for example, include a DCS. The historian 17 is a device for automatically collecting the huge event log data generated in the control system 16, and includes a database for the purpose of long-term storage. The historian 17 includes a storage medium, for example, a HDD.

The event storage 102 records the event log data inputted from the event collection unit 101 in an event log table stored in the event log database 11. The event log data includes the time of occurrence of the event, a device identifier (tag), an operation type identifier, a set value before changing, and a set value after changing.

The event log database 11 is a database for storing the event log table. The event storage unit 102 stores the event log data in the event log table. The event log database 11 includes storage mediums, for example, a HDD (Hard Disc Drive hard disk drive).

Examples of the event log table stored in the event log database 11, and the event log data recorded in the event log table will be described below with reference to FIG. 2. FIG. 2 is a diagram showing an example of the event log table stored in the event log database of the events analysis system according to the first embodiment of the present invention. As shown in the FIG. 2, the event log table is a two-dimensional table format, which includes a sequence of six data items such as an "event ID", a "date and time", a "tag name", an "operation type", a "previous value", and a "present value". Each line included in the event log table is respectively one event log data.

In the item of the "event ID (Identifier)", a value representing an identifier for uniquely identifying each event log is stored. In the item of the "date and time", a value representing the time which each event occurred in the control system 16 (i.e., the date and time in which the event log was generated) is stored. In the item of the "tag name", in the case that a plurality of the control system 16 exists, a value representing the device identifier (tag) for uniquely identifying the control system 16 that generated the event logs is stored. In the item of the "operation type", a value representing the identifier representing the type of operation performed by the DCS operator is stored. In the item of the "previous value", a value representing the setting value (the previous value) before the DCS operator changing the setting value is stored. In the item of the "current value", a value representing the setting value (the current value) after the DCS operator changing the setting value is stored. Incidentally, the format of the event log table described above is not limited to the above-noted example.

For example, the first the event log data shown in FIG. 2 represents that the DCS operator changes an operating mode of the "TAG1" device from "AUT" to "MAN" at "Aug. 21, 2015 at 10:00:00". It should be noted that, the "AUT" means an automatic operation, and the "MAN" means a manual operation. Subsequently, the second the event log data shown in FIG. 2 represents that the DCS operator changes the setting value of the "MV (an operation amount)" of the "TAG1" device from "25.0(%)" to "30.0(%)" at "Aug. 21, 2015 at 10:00:10".

Returning to FIG. 1 again, the configuration of the event processor according to the first embodiment will be described below. The event analyzer 103 acquires the event log data corresponding to the multiple work period specified by the user from the event log table. The event analyzer 103 divides the event log data into two stages to extracts the operation easy for the user.

First, in the first stage, the event analyzer 103 gathers the plurality of event log data to extract the basic unit operation representing the operation method. Then, in a second stage, the event analyzer 103 gathers the plurality of basic unit operation to extract the unit operation representing the operation intention of the DCS operator. The basic unit operation analyzer 1031 and unit operation analyzer 1032 provided in the event analyzer 103 respectively perform these extraction processes.

The basic unit operation analyzer 1031 analyzes the characteristics of changing of the continuity in time and the changing of the setting values based on the plurality of event log data to determine the operation method (such as the ramping and the fine-tuning) to extract the basic unit operation. The basic unit operation represents the operation method of the DCS operator described above. The basic unit operation analyzer 1031 extracts an event log group which is the event log group using the identical device and the same type operation types, extracts the basic unit operation based on the changing trend of the setting value and the continuity of the time in the event log group. The event log group is the group of the event log data which the value of the items in the "tag name" is identical, and the value of the item of "operation type" is identical in the event log table stored in the event log database 11. The basic unit operation analyzer 1031 records the extracted data representing the basic unit operation (hereinafter, referred to as the basic unit operation data) in the basic unit operation table stored in the analysis result database 12.

The analysis result database 12 is a database that stores the basic unit operation table and the unit operation table. The basic unit operation table and the unit operation table records the analysis result data indicating the analysis result of the event log data by the event analysis device 10. The analysis result database 12 includes storages, for example, a HDD.

The basic unit operation analyzer 1031, for example, acquires the information representing that the event memory 102 recorded the event log data in the event log table stored in the event log database 11 from the event memory 102. The basic unit operation analyzer 1031 implements the extraction process and the recording process of the basic unit operation as described above in the timing which the basic unit operation analyzer 1031 acquired the information.

An example of the basic unit operation table stored in the analysis result database 12 and the basic unit operation data recorded in the basic unit operation table will be described with reference to FIG. 3. FIG. 3 is a diagram showing an example of a basic unit operation table the analysis result database 12 of the event analysis system 1 stores according to the first embodiment of the present invention. As shown in FIG. 3, the basic unit operation table is a table format which includes the sequence of seven data items such as a "basic unit operation ID", a "starting date and time", an "ending date and time", a "tag name", an "operation type", an "operation method", and an "event ID". Each line included in the basic unit operation table is respectively one basic unit operation data.

In the item of the basic unit operation ID, a value representing the identifier for uniquely identifying each basic unit operation is stored. In the item of the starting date and time, a value representing the starting date and time of each basic unit operation is stored. The starting date and time means the date and time which the firstly generated plurality of event log among the event log included in the basic unit operation is generated. In the item of the ending date and time, the value representing the ending date and time of each the basic unit operation is stored. The ending date and time means the date and time which the lastly generated plurality of event log among the event log included in the basic unit operation is generated.

In the item of the tag name, in the case that a plurality of the control system 16 exists, a value representing the device identifier (the tag) for uniquely identifying the control system 16 that generated the event log is stored. In the item of the operation type, a value representing an identifier representing the operation type that the DCS operator performed is stored. In the item of the operation method, a value representing the operation method which the DCS operator performed is stored. In the item of the event ID, a value representing the event ID of each event log included in the basic unit operation is stored. Incidentally, the format of the basic unit operation table described above is not limited to the form described above.

For example, the first basic unit operation data (i.e., the basic unit operation data of which the basic unit operation ID is No. 1) shown in FIG. 3 represents that the DCS operator changes the operation mode of the "TAG1" device from "AUT" to "MAN" at "Aug. 21, 2015 at 10:00:00". Subsequently, the second basic unit operation data (i.e., the basic unit operation data of which the base unit operation ID is a "No. 2") shown in FIG. 3, represents that the DCS operator performed ramping the setting value of the "MV (the operation amount)" of the "TAG1" device, from "Aug. 21, 2015 at 10:00:10" to "Aug. 21, 2015 at 10:01:00". Since the value of the "operation method" is the "ramping +", the basic unit operation represents that the DCS operator performed ramping operation to increase the setting value.

Returning to FIG. 1 again, the configuration of the event processor according to the first embodiment will be described below. The unit operation analyzer 1032 estimates the operation intention representing which change the DCS operator gives to the process by using the information of the basic unit operation analyzed by the basic unit operation analyzer 1031 on the basis of the rule which is based on domain knowledge, and thereby the unit operation analyzer 1032 extracts the unit operation. The domain knowledge is, for example, the knowledge of controlling in the plant. The unit operation represents the operation intention performed by the DCS operator. The unit operation analyzer 1032 records the data representing the extracted unit operation (hereinafter, referred to as a unit operation data) to the unit operation table stored in the analysis result database 12.

The unit operation analyzer 1032 acquires, for example, the information representing that the basic unit operation analyzer 1031 recorded the basic unit operation data to the base unit operation table from the basic unit operation analyzer 1031. The unit operation analyzer 1032 implements the extraction and the recording of the unit operation described above at the timing of acquiring the information.

An example of the unit operation table stored in the analysis result database 12 and the unit operation data recorded in the unit operation table will be described with reference to FIG. 4. FIG. 4 is a diagram showing an example of the unit operation table the analysis result database 12 of the event analysis system 1 stores according to an embodiment of the present invention. As shown in the FIG. 4, the unit operation table is a table format which include a sequence of six data items such as an "unit operation ID", a "starting date and time", an "ending date and time", a "tag name", an "operation intention", and a "basic unit operation ID". Each line included in the unit operation table is respectively one unit operation data.

In the item of the "unit operation ID", a value representing the identifier for uniquely identifying each unit operation is stored. In the item of "starting date and time", a value representing the starting date and time of each unit operation is stored. The starting date and time is the date and time of the firstly performed basic unit operation among the basic unit operation included in the unit operation. In the item of the "ending date and time", a value representing the ending date and time of each unit operation is stored. The ending date and time is the date and time of the lastly performed basic unit operation among the basic unit operation included in the unit operation.

In the item of the "tag name", in the case that a plurality of the control system 16 exists, a value representing the device identifier (the tag) for uniquely identifying the control system 16 that generated the event log is stored. In the item of the "operation intention", a value representing the operation intention which the DCS operator performed is stored. In the item of the "basic unit operation ID", a value representing the basic unit operation ID in each basic unit operation included in the unit operation is stored. Incidentally, the format of the unit operation table described above is not limited to the form described above.

For example, the first unit operation data (i.e., the unit operation data of which the unit operation ID is "No. 1") shown in FIG. 4, represents that the DCS operator performed operation intended "increasing the flow amount" of the "TAG1" device, "Aug. 21, 2015 at 10:00:10" to "Aug. 21, 2015 at 10:03:01". Subsequently, the second unit operation data (i.e., the unit operation data of which the unit operation ID is "No. 2") shown in FIG. 4, represents that the DCS operator performed operation intended "fine-tuning of the temperature" of the "TAG1" device, "Aug. 21, 2015 at 10:00:50" to "Aug. 21, 2015 at 10:02:50".

Returning to FIG. 1 again, the configuration of the event processor according to the first embodiment will be described below. An operation sequence extractor 104 generates the data combined the data representing the basic unit operation and the data representing the unit operation extracted by the event analyzer 103 in time order. In the embodiment, the data combined the data representing the basic unit operation and the data representing the unit operation in time order is to be referred to as an "operation sequence".

The operation sequence consisting of the basic unit operation includes information indicating an "operation method" representing which value of the parameters in which way the DCS operator changed for each device. Further, the operation sequence including the unit operation includes information representing an "operation intention" representing which intention the DCS operator operated for each device.

The operating sequence extractor 104 stores the operation sequence extracted for each work period in the operation sequence database 13. The operation sequence database 13 is a database that stores the operation sequence. The operation sequence database 13 includes storage medium, for example, a HDD.

The operation sequence clusterer 105 determines a similarity between each of the operation sequences to a plurality of operation sequences which the operation sequence extractor 104 extracted, and further clusters the operation sequence based on the determined similarity. Further, the operation sequence clusterer 105, for each group of the clustered operation sequence, performs a statistical processing such as an aggregation of operation frequency and operation time. The operation sequence clusterer 105 stores the cluster analysis result which is a result of the cluster analysis processing and the statistical processing described above in the cluster analysis result database 14. The cluster analysis result database 14 is a database for storing the cluster analysis result of the operation sequence. The cluster analysis result database 14 includes a storage medium, for example, a HDD.

The clustering result output unit 106 visualizes the cluster analysis result of the operation sequence performed by the operation sequence clusterer 105. The cluster analysis result output unit 106 displays the images of the operation sequences for each group, by the list or on the time axis, on the display 15. Further, the clustering result output unit 106 displays the statistical analysis result for each group on the display 15. The display 15 may display includes, for example, a liquid crystal display or an organic EL (Erectro Luminescence) display.

(The Behavior of the Event Analysis Device)

Figure 5:
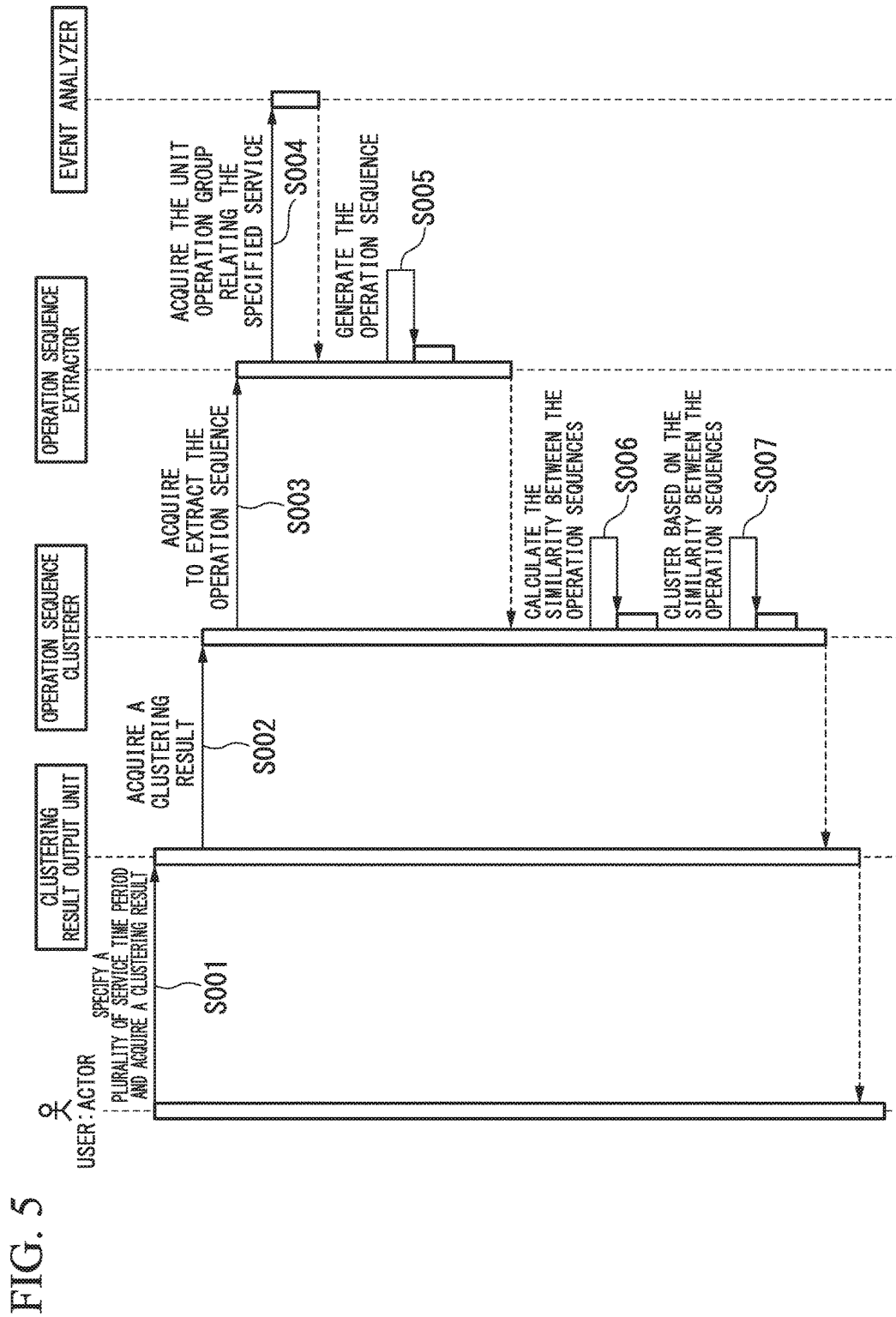
FIG. 5 is a sequence diagram showing an operation of the event analysis device according to the first embodiment of the present invention.

Next, the operation of the event analysis device 10 will be described with reference to the drawings. FIG. 5 is a sequence diagram showing an operation of the event analysis device 10 according to the first embodiment of the present invention. In FIG. 5, an example of the operation in the case that the user specifies a plurality of implementation periods of the targeted work to refer to the cluster analysis result according to the operation sequence consisting of the unit operation will be described.

(Step S001) The clustering result output unit 106 acquires information indicating a plurality of work periods specified by the user. That is, the user specifies the plurality of work periods to request the display of the cluster analysis result.

(Step S002) The clustering result output unit 106 requests the cluster analysis result of the operation sequence corresponding to a plurality of specified work periods to the operation sequence clusterer 105 in response to a user's request.

(Step S003) The operation sequence clusterer 105 requests the extraction of the operation sequence corresponding to a plurality of specified work periods to the operation sequence extractor 104.

(Step S004) The operating sequence extractor 104 requests the extraction of the operation data group of the specified works corresponding to a plurality of specified work periods to the event analyzer 103. The event analyzer 103 acquires a plurality of event log data groups corresponding to a plurality of specified work periods from the event log database 11. The event analyzer 103 extracts the basic unit operation data group based on the acquired event log data group. Then, the event analyzer 103 extracts the unit operation data group based on the extracted basic unit operation data. The event analyzer 103 outputs the extracted unit operation data to the operation sequence extractor 104.

(Step S005) The operation sequence extractor 104 sorts the unit operation data inputted from the event analyzer 103 in the operation start time order to generate the operation sequence. The operation sequence extractor 104 outputs the generated operation sequence data to the operation sequence clusterer 105.

(Step S006) The operation sequence clusterer 105 determines a similarity between the operation sequences, for all of the plurality of operation sequences based on the operation sequence data inputted from the operation sequence extractor 104.

(Step S007) The operation sequence clusterer 105 performs clustering clustering the operation sequence based on the determined similarity. The operation sequence clusterer 105 outputs the cluster analysis result acquired by clustering to clustering result output unit 106.

Then, the clustering result output unit 106 visualizes the cluster analysis result of the operation sequence to display on the display 15. Thus, the user can refer to the cluster analysis result outputted from the clustering result output unit 106 via the display 15 to confirm the difference of the operation procedure according to the purpose of the work and external conditions.

Incidentally, the operation sequence clusterer 105 can cluster the operation procedure based on the difference in the operation method, in the case of using the "basic unit operation" representing a concrete operation procedure, instead of using the "unit operation" described in the above example as a component of the operation sequence.

As described above, in step S004, the event sequence in the work period is cut out in order to extract the event log data corresponding to the specified work. However, the events occurred within the specified operation period is not necessarily an event related to the specified operation. Therefore, the event sequence cut out here is the event sequence includes the event relieving the irrelevant events to the specified work events (e.g., such as frequent events) from all events occurred within the specified work period.

The irrelevant events with aforementioned specified work is detected, for example, by regarding a higher probability events as the frequent event in the entire period of the event log of all works that are not limited to specified work. Further, when a plurality of the work periods are specified, it may relieve the irrelevant events by evaluating the relationship between the specified works on the basis of the occurrence probability of each event within the specified operational period.

Furthermore, when the event sequence is cut out over a specified period, it does not necessarily need to be cut out the event sequence according to the specified starting time and ending time, it may be cut out the event sequence considering the continuity of the series of events including the events in the front and back of the starting time and ending time. That is, for example, it may cut out the event sequence in the period included a constant buffer period of before the starting time and after the ending time, according to provide a constant buffer period before the starting time and after the ending time.

For example, in the case the events of type X of the device A is continuously generated in a short period in the vicinity of the specified ending time, without forcibly terminating the cutting-out of the event sequence at the specified ending time, and at the timing exceeds the predetermined buffer time or when time interval of the events of the type X of the device A exceeds the threshold value, it may terminate the cutting-out of the event sequence.

As described above, in step S005, firstly, the operation sequence extractor 104 extracts the basic unit operation or the unit operation configuring the operation sequence (it may be the unit operation in the above example). The operation sequence extractor 104 sorts the extracted basic unit operation group or the extracted unit operation group in the operation starting time order to generate the operation sequence. The generated operation sequence represents not only a combination of the multiple operations but also represents the order of operation.

As described above, in step S006, the operation sequence clusterer 105 determines the similarity between the operation sequences of the extracted all operation sequences. The operation sequence is formed by arranging the basic unit operation or the unit operation in the generation time order, which is one type of an array data. It can be used the edit distance (e.g., Damerau-Levenshtein distance, etc.) which is, for example, used to quantify the similarity between the sequences data such as the character string and the DNA sequences, for the determination of the similarity. (Reference literature: ". A technique for computer detection and correction of spelling errors" Damerau, Communications of the ACM, 7 (3), pp. 659-664, 1964).

A general edit distance is, in one of two sequence data, the minimum editing number or the minimum edit cost required to transform one sequence data to the other (another) sequence data by insertion, deletion, substitution, or transposition of adjacent data. However, it is difficult to define the similarity between the operation sequences of the operation in the control system of the DCS or the like, using conventional edit distance as it is.

For example, from the viewpoint of the operation of the plant, it can be considered that the operation which the setting change amounts are different in the same devices is more similar operation than the operation in the different device. However, in a case of using the conventional edit distance, it is difficult to consider the similarity between the individual operations because it does not determine only match-mismatch of the components of the array. The conventional edit distance targets sequences aligned sequentially such as the character sequences so that it is difficult to consider the differences between the parallel operations and the sequential operations.

Therefore, the event analysis device 10 according to the first embodiment incorporates the viewpoint in operation of the plant to determine the degree of similarity between the operation sequences, using the weighted edit distance in consideration of the similarity of the unit operation with each other and the difference of the parallel operations and the sequential operations.

Firstly, it is considered that the difference is smaller in a case that the type of devices are same and the setting change amounts are different than the difference of the operation sequences when the type of the devices are different. Therefore, the event analysis device 10 sets the weight of editing cost smaller, regarding the replacement of the operation sequences when the configuration change amounts are different and the type of the devices are same. For example, if the edit cost is 1 in the case of replacing the increasing operation in the device of which the tag name is the "T01" to the increasing operation in the device of which the tag name is the "F01", the edit cost in the case of replacing the increasing operation in the device of which the tag name is the "T01" to the fine-tuning operation in the device of which the tag name is the "T01" is set to a value smaller than 1.

Further, the importance of the fine-tuning operation for causing the state of the process stabilized is considered to be relatively low, as compared with the importance of the operation for changing the state of the process. Therefore, the event analysis device 10 sets smaller the weight of the editing costs associated with the presence or absence of the fine-tuning operation. For example, if the edit cost is 1 in the case of reducing/adding the increasing operation in the device of which the tag name is the "T01", the edit cost in the case of reducing/adding the fine-tuning operation in the device of which the tag name is the "T01" is set to a value smaller than 1.

Further, it is considered that the difference of the sequences of the starting time of the parallel operation is smaller than the difference of the sequences of the starting time of the sequential operation. Therefore, the event analysis device 10 sets the weight of editing cost smaller, regarding the transposition of the two operations determined that it is possibly the parallel. For example, if the edit cost is 1 in the case of transposing the order of the starting time of the sequential operation A and B, the edit cost in the case of transposing the order of the starting time of the parallel operation A and B is set to a value smaller than 1.

Incidentally, the parallel operations referred to here, in the case of the unit operation, continue to operate the two tags alternately after the unit operation of one tag started. The detection of the parallel operation is, for example, determined the parallel operation in the case that "(the starting time of the latter unit operation)<(the starting time of the previous unit operation+0.5×implementation period)" is met, in the adjacent two unit operations.

Similarly, when the event analysis device 10 determines the similarity between the operation sequences consisting of the basic unit operation, the event analysis device 10 according to the first embodiment incorporates the viewpoint in the operation of the plant, and then determines the similarity of the operation sequences using the weighted edit distance in consideration of the similarity among the basic unit operation and the differences between the parallel operation and the sequential operation.

In the weighting in consideration of the similarity among the basic unit operation, in addition to the weighting of the similarity among the above-mentioned unit operation, the weighting of the operation method is performed. For example, it is considered that the difference is smaller in a case that the changing method is different for the same operation target than in a case that the difference of the operation sequences is different for the same device. The former case is, for example, the operation for the setting value SV of the device of which the tag name is "F01" and the operation for the output MV of the device of which the tag name is "F01". The latter case is, for example, the ramping+operation for the SV value of the device of which the tag name is "F01" and the setting change+operation for the SV value of the device of which the tag name is "F01". Therefore, the event analysis device 10 sets the weight of editing cost smaller, regarding the replacement of the operation when the changing methods are different and the device targets are same.

The adjustment of the weights is carried out according to the object of the user and the condition of each plant. Further, as described above, due to the weighted edit distance represents the dissimilarity, the similarity between two operation sequences is defined by the following equation.

(The similarity between the operation sequences)=1−(The weighted edit distance)/(The maximum edit distance).

The maximum edit distance is the edit cost that each component of the two operation sequences do not completely correspond (is all different from each other), and is determined on the basis of the weight related to the number of the unit operations configuring the operation sequences and the presence or absence of each of the unit operations. As a result, the degree of similarity between the operation sequences is 1 in the case where the components of the two unit operation sequences completely match. Further, the degree of similarity between the operation sequences is 0 in the case where the components of the two unit operation sequences do not completely match.

As described above, in Step S007, the operation sequence clusterer 105 clusters all the operation sequences by using hierarchical clustering method based on the similarity determined by the above method. The cluster analysis method based on the hierarchical clustering is the method to sequentially merge the operating procedures of the high degree similarity with each other from the initial state of the 1 class and the 1 operation sequence. As an algorithm of the hierarchical clustering, the single-linkage-clustering, the complete linkage clustering, or the average linkage clustering between the merged groups are used.

Figure 6:
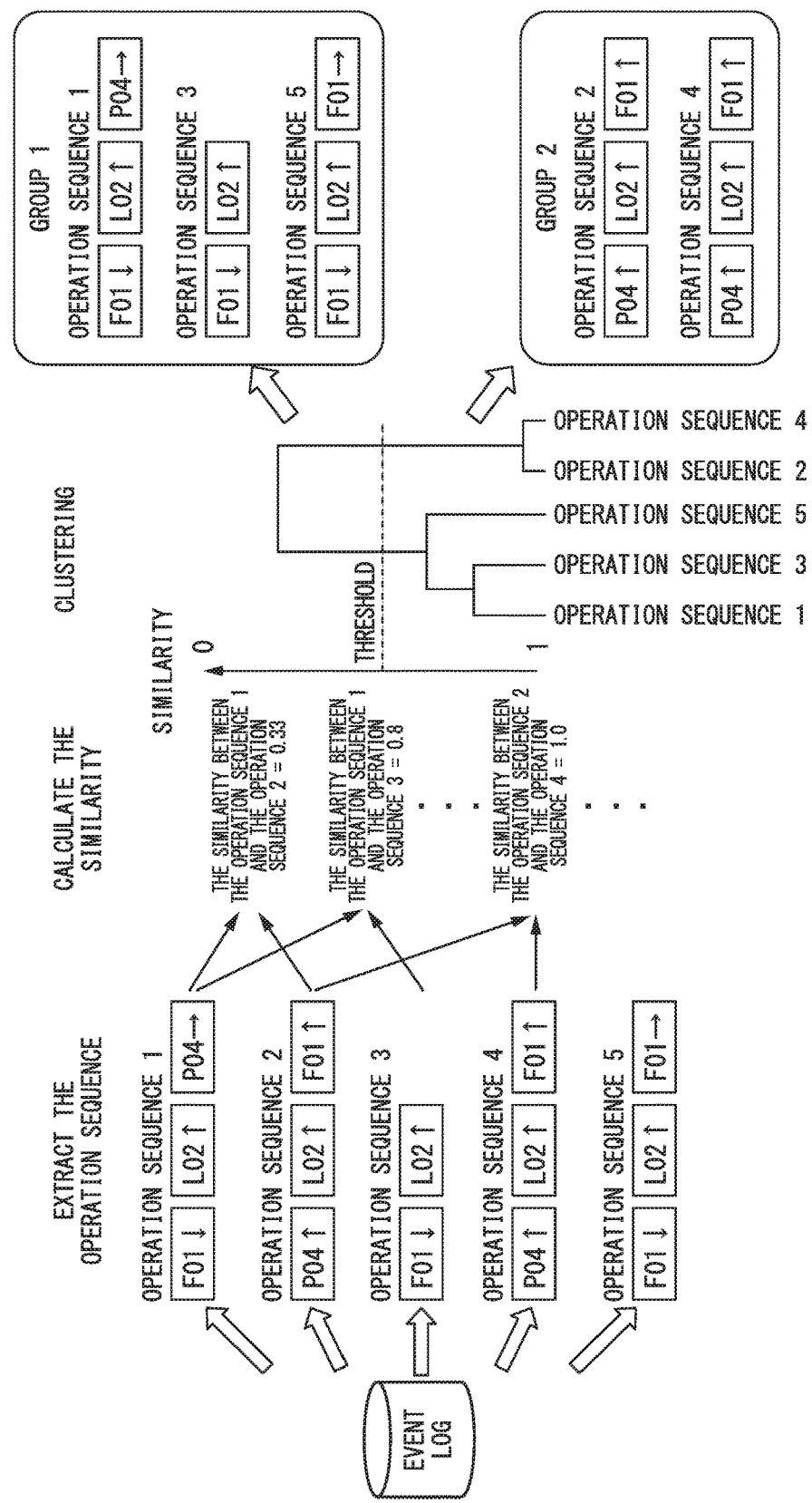
FIG. 6 is a schematic diagram showing an example of a cluster analysis processing of the operation sequences by the event analysis device according to the first embodiment of the present invention.

Next, the cluster analysis processing of the operation sequence in a case where the plurality of work periods are specified, will be described with reference to the drawings. FIG. 6 is a schematic diagram showing an example of a cluster analysis processing of the operation sequence by the event analysis device 10 according to the first embodiment of the present invention.

FIG. 6 represents that the user specifies five work periods, and firstly, the operation sequence extractor 104 extracted the five operation sequences (operation sequence 1, operation sequence 2, . . . , Operation sequence 5) from the event log data. Next, the operation sequence clusterer 105 uses a weighted edit distance as described above, and determines the similarity between all operation sequences. For example, as shown in FIG. 6, in comparison with the operation sequence 1 and the operation sequence 2, though the type of device to operate is the same, the operation sequence and the operation direction are greatly different. At least two times substitution are required in order to convert the operation sequence 1 to operation sequence 2. In other words, the replacement of the reduction operation "F01 ↓" of the device of which the tag name is "F01" which is the first event of the operation sequence 1, and the increasing operation "P04 ↑" if of the device of which the tag name is "P04" which is the first event of the operation sequence 2 is needed. And the replacement of the fine-tuning operation "P04 →" of the device of which the tag name is "P04" which is the third event of the operation sequence 1, and the increasing operation "F01 ↑" of the device of which the tag name is "F01" which is the third event of the operation sequence 2 is needed. Therefore, the similarity between the operation sequence 1 and the operation sequence 2 is "1−(⅔)≈0.33", according to the above formula.

Further, for example, as shown in FIG. 6, in comparison with the operation sequence 1 and operation sequence 3, the difference is only presence or absence of the fine-tuning operation "P04 →" of the device of which the tag name is "P04". Therefore, for example, if the weighting regarding the presence or absence of the fine-tuning operation is set to 0.5 in advance, the degree of similarity between the operation sequence 1 and the operation sequence 3 is 1−(0.5/2.5)=0.8, according to the above-noted equation. Further, for example, as shown in FIG. 6, in comparison with the operation sequence 2 and the operation sequence 4, since both components (event) are perfectly corresponded, the similarity is 1.0.

Then, the operation sequence clusterer 105 processes to combine the high similarity operation sequences in one group using the hierarchical clustering method. FIG. 6 represents that the operation sequence clusterer 105 clusters the five operation sequences into two groups (Group 1 and Group 2). That is, the operation sequence clusterer 105 clusters the operation sequence 1, the operation sequence 3, and the operation sequence 5 into the group 1, and clusters the operation sequence 2 and the operation sequence 4 into the group 2.

As described above, the event analysis device 10 according to the first embodiment, without directly using the event sequence, using the higher operation sequence than the event sequence, automatically clusters the manual operation of the past particular works based on the similarity between the operation sequences. Thus, the event analysis device 10 may support the standardization and automation of the manual operation by the DCS operator. For example, the event analysis device 10 can isolate the situations in which the object of the works and the external conditions are different based on the cluster analysis result of the operation sequence consisting of the unit operation. Thus, the operation procedure of the operation of the DCS operator can be easily organized by the event analysis device 10. Further, for example, the event analysis device 10 may present a difference in the operation method by the DCS operator based on the cluster analysis result of the operation sequence consisting of the basic unit operation. Thus, the event analysis device 10 can easily derive the better operation method.

Thus, the event analysis device 10 according to the first embodiment can cluster the event sequences based on the similarity between the high abstract operation sequences to support the standardization of the operation by the DCS operator.

Second Embodiment

Figure 7:
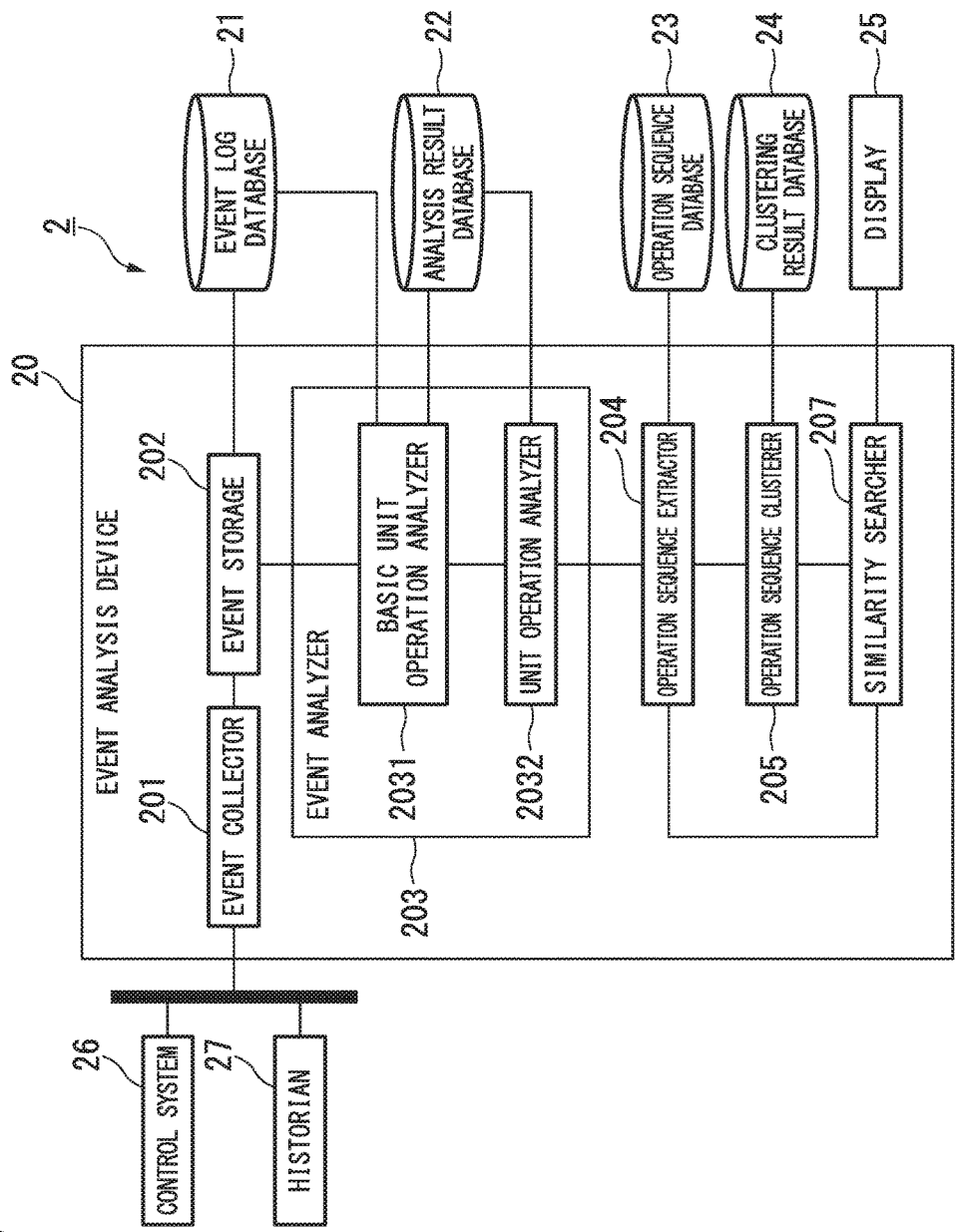
FIG. 7 is a block diagram showing a functional configuration of an event analysis system and the event analysis device according to a second embodiment of the present invention.
Figure 8:
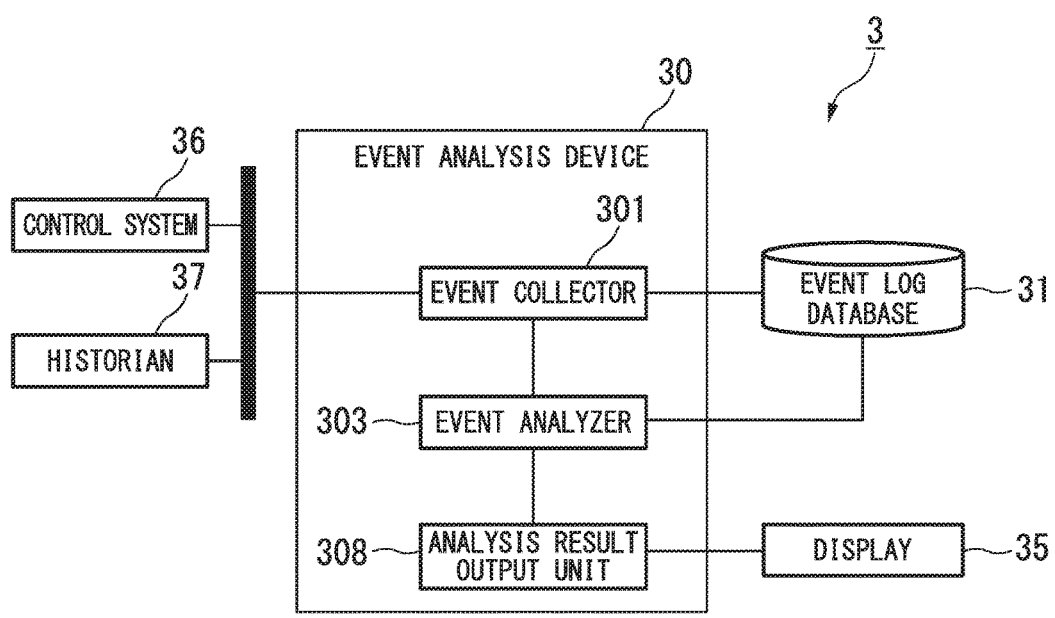
FIG. 8 is a block diagram showing the functional configuration of a prior event analysis system and an event analysis device.

Next, a second embodiment of the present invention will be described with reference to the drawings. FIG. 7 is a block diagram showing a functional configuration of the event analysis system 2 and an event analysis device 20 according to the second embodiment of the present invention. Incidentally, the common portions (block of which the name is same) with the functional configuration providing the event analysis system 1 and the event analysis device 10 in the first embodiment, the description thereof is omitted. A configuration of the second embodiment of the present invention is based on the configuration of the first embodiment of the present invention, and may further add some necessary configurations.

As shown in FIG. 7, the event analysis device 20 according to the second embodiment includes a similarity searcher 207. The operating sequence extractor 204 extracts the operation sequence the DCS operator currently performing in real time. In addition, the operation sequence clusterer 205 can efficiently search the similar operation cases by determining the degree of similarity not with all of the past operation sequences but with each operation sequence group (or representative operation sequences of each group). The event analysis device 20 according to the second embodiment can present the operation history, the alarm history, and the process data history in the case of performing similar operation in the past, by searching the past similar operation cases. Thus, the event analysis device 20 can collect the useful information for the online operation support such as prediction information of the future situation.

Though the embodiments of the present invention have been detailed described above, there is no restriction to the above-noted embodiment, and appropriate changes can be made within the scope of the invention.

Incidentally, it may also realize a part or all of the event analysis device 10 and the event analysis device 20 with a computer according to the embodiment described above. In that case, the program for realizing the control function may be realized by recording on a computer-readable recording medium, and installing the program recorded in the recording medium into a computer system, and executing the program. Further, the computer system may read and execute the program recorded in the cloud.

The computer system may be a computer system incorporated in the event analysis device 10 and the event analysis device 20, and may include a hardware such as an OS and peripheral devices. In addition, the computer-readable recording medium refers to a flexible disk, a magneto-optical disk, a ROM, a portable medium such as a CD-ROM, and a memory such as a hard disk incorporated in the computer system.

Even more, the computer-readable recording medium may include a medium which holds the program dynamically and in short time, such as a communication circuit used in the case of transmitting a program via a communication circuit such as a network or a telephone circuit such as the Internet. Further, the computer-readable recording medium may include a medium which holds the program in predetermined time such as a volatile memory inside the computer system serving as a server or a client. Furthermore, the program may implement a part of the above functions. Moreover, the program may implement the above described functions in combination with previously recorded programs in the computer system.

The event analysis device 10 and the event analysis device 20 in the embodiment described above may be realized as an integrated circuit such as the LSI (Large Scale Integration). Each functional block of the event analysis device 10 and the event analysis device 20 may individually be a processor. Each functional block of the event analysis device 10 and the event analysis device 20 may be a processor by being integrated part or whole thereof. In addition, the method of circuit integration may be realized by a dedicated circuit or a general-purpose processor, not limited to the LSI. Further, if the integrated circuit technology replacing the LSI appears by advancing the semiconductor technology, the integrated circuit according to the technology may be used.

What is claimed is:

1. An event analysis device for use in a distributed control system controlling a plant, said device comprising:
   an event collector configured to collect event log data during a plurality of work periods, the event log data representing an operation performed on the distributed control system by an operator;
   an event analyzer configured to extract first analysis result data from the event log data collected by the event collector, the first analysis result data representing a method of the operation performed on the distributed control system by the operator, or extract second analysis result data from the first analysis result data, the second analysis result data representing an intention of the operation performed on the distributed control system by the operator;
   an operation sequence extractor configured to generate a plurality of operation sequences for each of the work periods, the operation sequence arranging the first analysis result data or the second analysis result data extracted by the event analyzer in chronological order based on operation time; and an operation sequence clusterer configured to:
  determine a degree of similarity between the operation sequences which are different from each other using a weighted edit distance in consideration of similarity of the first analysis result data or the second analysis result data of one or more of controllers and a difference of order, sequential relation, or parallel relation of the first analysis result data or the second analysis result data of the controllers; and
  cluster the operation sequences based on the determined degree of the similarity,
  wherein the operation sequence clusterer is configured to set a first weight of editing cost smaller than other editing costs, the first weight of editing cost being regarding replacement of the operation sequences in a case where types of the controllers are same and configuration change amounts of the controllers are different in the weighted edit distance.

2. The event analysis device according to claim 1, wherein the operation sequence clusterer is configured to cluster the operation sequences based on a difference of one or more of the controllers to be operated, based on the difference of the order of one or more of the operations on one or more of the controllers, and based on a difference whether one or more of the operations on one or more of the controllers are parallel operations or sequential operations, the parallel operation being an operation in which, after the unit operation of one tag is started, the unit operation of a next tag is started and operations of two tags are continued alternatively.

3. The event analysis device according to claim 1, further comprising:
  a cluster analysis result output unit configured to visualize and display the operation sequence clustered by the operation sequence clusterer.

4. The event analysis device according to claim 2, further comprising:
  a cluster analysis result output unit configured to visualize and display the operation sequence clustered by the operation sequence clusterer.

5. The event analysis device according to claim 1, further comprising:
  a similarity searcher configured to search the operation sequence groups similar to the operation sequence, based on the degree of the similarity between the operation sequences extracted by the operation sequence extractor and a representative operation sequence included in the operation sequence groups clustered in the past by the operation sequence clusterer.

6. The event analysis device according to claim 2, further comprising:
  a similarity searcher configured to search the operation sequence groups similar to the operation sequence, based on the degree of the similarity between the operation sequences extracted by the operation sequence extractor and a representative operation sequence included in the operation sequence groups clustered in the past by the operation sequence clusterer.

7. The event analysis device according to claim 1, further comprising:
  a log data manager configured to output the event log data.

8. The event analysis device according to claim 7, wherein the operation sequence clusterer is configured to cluster the operation sequences based on a difference of one or more of controllers to be operated, based on the difference of the order of one or more of the operations on one or more of the controllers, and based on a difference whether one or more of the operations on one or more of the controllers are parallel operations or sequential operations, the parallel operation being an operation in which, after the unit operation of one tag is started, the unit operation of a next tag is started and operations of two tags are continued alternatively.

9. The event analysis device according to claim 7, further comprising:
  a cluster analysis result output unit configured to visualize and display the operation sequence clustered by the operation sequence clusterer.

10. The event analysis device according to claim 8, further comprising:
  a cluster analysis result output unit configured to visualize and display the operation sequence clustered by the operation sequence clusterer.

11. The event analysis device according to claim 7, further comprising:
  a similarity searcher configured to search the operation sequence groups similar to the operation sequence, based on the degree of the similarity between the operation sequences extracted by the operation sequence extractor and a representative operation sequence included in the operation sequence groups clustered in the past by the operation sequence clusterer.

12. The event analysis device according to claim 8, further comprising:
  a similarity searcher configured to search the operation sequence groups similar to the operation sequence, based on the degree of the similarity between the operation sequences extracted by the operation sequence extractor and a representative operation sequence included in the operation sequence groups clustered in the past by the operation sequence clusterer.

13. The event analysis device according to claim 1, wherein
  the operation sequence clusterer is configured to set second weight of editing cost smaller than other editing costs, the second weight of editing cost being regarding presence or absence of a fine-tuning operation of the controllers in the weighted edit distance.

14. The event analysis device according to claim 1, wherein
  the operation sequence clusterer is configured to set third weight of editing cost smaller than other editing costs, the third weight of editing cost being regarding transposition of two operations determined to be parallel for the controllers in the weighted edit distance.

15. The event analysis device according to claim 1, wherein
  the operation sequence clusterer is configured to set fourth weight of editing cost smaller than other editing costs, the fourth weight of editing cost being regarding replacement of operations in a case where changing methods are different for a controller which is a same target in the weighted edit distance.

16. An event analysis method for use in a distributed control system controlling a plant using a computer, comprising:

collecting an event log data during a plurality of work periods, the event log data representing an operation performed on the distributed control system by an operator;

extracting first analysis result data from the event log data collected, the first analysis result data representing a method of the operation performed on the distributed control system by the operator, or extracting second analysis result data from the first analysis result data, the second analysis result data representing an intention of the operation performed on the distributed control system by the operator;

generating a plurality of operation sequences for each of the work periods, the operation sequence arranging the first analysis result data or the second analysis result data extracted in chronological order based on operation time;

determining a degree of similarity between the operation sequences which are different from each other using a weighted edit distance in consideration of similarity of the first analysis result data or the second analysis result data of one or more of controllers and a difference of order, sequential relation, or parallel relation of the first analysis result data or the second analysis result data of the controllers; and clustering the operation sequences based on the determined degree of the similarity, wherein determining the degree of the similarity comprises setting a first weight of editing cost smaller than other editing costs, the first weight of editing cost being regarding replacement of the operation sequences in a case where types of the controllers are same and configuration change amounts of the controllers are different in the weighted edit distance.

17. The event analysis method according to claim 16, wherein extracting the analysis result data further comprises clustering the operation sequences based on a difference of one or more of the controllers to be operated, based on the difference of the order of one or more of the operations on one or more of the controllers, and based on a difference whether one or more of the operations on one or more of the controllers are parallel operations or sequential operations, the parallel operation being an operation in which, after the unit operation of one tag is started, the unit operation of a next tag is started and operations of two tags are continued alternatively.

18. The event analysis method according to claim 16, further comprising:

visualizing and displaying the operation sequence clustered.

19. The event analysis method according to claim 16, further comprising:

searching the operation sequence groups similar to the operation sequence, based on the degree of the similarity between the operation sequences extracted and a representative operation sequence included in the operation sequence groups clustered in the past.

20. A non-transitory computer readable storage medium that stores a computer program for causing, when executed by a computer, the computer to perform:

collecting event log data during a plurality of work periods, the event log data representing an operation performed on a distributed control system by an operator, the distributed control system controlling a plant;

extracting first analysis result data from the event log data collected, the first analysis result data representing a method of the operation performed on the distributed control system by the operator, or extracting second analysis result data from the first analysis result data, the second analysis result data representing an intention of the operation performed on the distributed control system by the operator;

generating a plurality of operation sequences for each of the work periods, the operation sequence arranging the first analysis result data or the second analysis result data extracted in chronological order based on operation time;

determining a degree of similarity between the operation sequences which are different from each other using a weighted edit distance in consideration of similarity of the first analysis result data or the second analysis result data of one or more of controllers and a difference of order, sequential relation, or parallel relation of the first analysis result data or the second analysis result data of the controllers; and clustering the operation sequences based on the determined degree of the similarity, wherein determining the degree of the similarity comprises setting a first weight of editing cost smaller than other editing costs, the first weight of editing cost being regarding replacement of the operation sequences in a case where types of the controllers are same and configuration change amounts of the controllers are different in the weighted edit distance.

* * * * *